United States Patent [19]

Moore et al.

[11] Patent Number: 5,417,236
[45] Date of Patent: May 23, 1995

[54] AUTOMATED PROCESS GAS SUPPLY SYSTEM FOR EVACUATING A PROCESS LINE

[75] Inventors: Gary M. Moore, San Jose; Richard S. Pairish, San Ramon, both of Calif.

[73] Assignee: Moore Epitaxial, Inc., San Jose, Calif.

[21] Appl. No.: 109,191

[22] Filed: Aug. 19, 1993

Related U.S. Application Data

[62] Division of Ser. No. 860,915, Mar. 31, 1992, Pat. No. 5,240,024.

[51] Int. Cl.$^6$ ............................................. F16K 17/36
[52] U.S. Cl. ........................................ 137/15; 137/238
[58] Field of Search ...................... 137/15, 38, 39, 237, 137/238

[56] References Cited

U.S. PATENT DOCUMENTS

| | | | |
|---|---|---|---|
| 4,098,284 | 7/1978 | Yamada | 137/39 |
| 4,832,759 | 4/1989 | Diamond | 137/45 |
| 4,842,844 | 6/1989 | Harris | 137/15 X |
| 4,852,600 | 8/1989 | Asbra et al. | 137/38 |

*Primary Examiner*—Robert G. Nilson
*Attorney, Agent, or Firm*—Skjerven, Morrill, MacPherson, Franklin & Friel; Forrest E. Gunnison; Eric E. Hoffman

[57] ABSTRACT

A process gas supply system at the gas supply point includes an automated means for evacuating gas in a process line fed by the process gas supply system when an abnormal event occurs. The process gas supply system of this invention eliminates the need for any special valves or piping at the point of use of the process gas as well as the need for a return line from the point of use to the process gas supply system to purge the process line. A process gas is contained in a cylinder under pressure. The cylinder is coupled to a process line by the process gas supply system. The process gas supply system includes a gas flow controller and an automatic evacuation system. The gas flow controller controls the supply of the process gas from the cylinder to the process line. In an abnormal event, process gas flow from the cylinder is blocked by the gas flow controller and the automatic evacuation system evacuates the process gas not only from the gas flow controller, but also from the process line.

7 Claims, 8 Drawing Sheets

AUTOMATED PROCESS GAS SUPPLY SYSTEM FOR EVACUATING A PROCESS LINE

This application is a division of application Ser. No. 07/860,915, filed Mar. 31, 1992, now U.S. Pat. No. 5,240,024.

BACKGROUND OF THE INVENTION

1. Field of the Invention

This invention relates generally to a gas supply system at a process gas supply point and in particular to a gas supply system at a process gas supply point that automatically evacuates both the gas supply system and a process line supplied by the gas supply system.

2. Description of Related Art

Many hazardous gasses, e.g., caustic, explosive, or poisonous gasses, are routinely used in industry. For example, in semiconductor processing, hydrogen and silane are routinely used. Typically, the gas is contained in a cylinder 101 (FIG. 1) under pressure. One or more cylinders are contained in a gas cabinet 102. Cylinder 101 is coupled to a process line 104 by a gas supply system 103. The hazardous gas flows from cylinder 101 through gas supply system 103 to process line 104 and in turn through process line 104 to a point of use 105, such as an epitaxial reactor used in semiconductor processing. Typically, point of use 105 is in a special room 106 or facility that is located some distance from gas cabinet 102.

When gas cylinder 101 is empty or nearly empty, gas cylinder 101 is replaced with a new cylinder 107. During the new gas cylinder installation, gas supply system 103 first isolates process line 104 so that contaminants are minimized at point of use 105. Next, gas supply system 103 is purged using a non-hazardous gas. When gas supply system 103 contains only the non-hazardous gas, cylinder 101 is removed and new cylinder 107 installed.

After new cylinder 107 is installed, the process is reversed. The non-hazardous gas in gas supply system 103 is purged using gas from newly installed cylinder 107 and then process line 104 is opened so that the gas is available at point of use 105.

One configuration of gas supply system 103 is illustrated in more detail in FIG. 2 as gas supply system 203. During normal operation, gas flows from cylinder 201 through valve 210 and filter 211 to valve 212. Valve 212 is a three-way valve that diverts the flow to regulator 215. Regulator 215 controls the gas flow into process line 204. As is well known to those skilled in the art, regulator 215 allows flow only in the direction from gas cylinder 201 to process line 204 and prevents reverse flow from process line 204 through regulator 215.

To change cylinder 201 with gas supply system 203, the position of valve 212 is changed so that gas flow to regulator 215 is prevented and thereby process line 204 is isolated. Valve 210 is closed to block flow from cylinder 201 and valves 213 and 217 are opened. When valve 217 is open, a vacuum generator supply gas flows through check valve 218 and valve 217 and vacuum generator 216 to purge vent line 221.

As is known to those skilled in the art, when the vacuum generator supply gas flows through vacuum generator 216 a relative low pressure is produced on the line to the vacuum generator from check valve 214. Accordingly, the relatively higher pressure hazardous gas left in gas supply system 203 flows through filter 211, valve 212, valve 213 and flow check valve 214 and is evacuated through purge vent line 221. In this way, the hazardous gas is removed from gas supply system 203 so that cylinder 201 may be replaced without danger of hazardous gas flow through valve 210 if valve 210 should be inadvertently opened. Notice, however, that both regulator 215 and valve 212 prevent evacuation of process line 204 by this method.

Another configuration for gas supply system 103 is illustrated in FIG. 3 as gas supply system 303. In gas supply system 303 during normal operation, gas flows from cylinder 301 through filter 311 and valve 302 to regulator 315. High pressure isolation valve 312 blocks flow to vent line 321 during normal operation. Again, flow through regulator 315 is only in the direction from gas cylinder 301 to process line 304.

In normal operation, gas flow from regulator 315 passes through low pressure isolation valve 323 to process line 304. Low pressure isolation valve 323 blocks gas flow through valves 324 and 325 to vent line 321 during normal operation.

If the regulator 315 must be changed, valve 312 is positioned to connect the high pressure side of regulator 315 to vacuum generator 316 through valve 313 and check valve 314. Similarly, low pressure isolation valve 323 is positioned to isolate process line 304 and connect the low pressure side of regulator 323 to vacuum generator through check valve 325 to vent 321. Vacuum generator 316 functions in a manner identical to vacuum generator 216 (FIG. 2) so that the hazardous gas is evacuated so that regulator 315 can be changed.

In this embodiment to change cylinder 301, low pressure isolation valve 323 is positioned so that flow from regulator 315 passes through valve 324, which is opened, and check valve 325 to vent line 321 and consequently, process line 304 is isolated. A purge gas is introduced through check valve 326 and purge gas control valve 310 to filter 311 and passes through valves 312, 313 and 314 to vacuum generator 316 in vent line 321.

To enhance the evacuation of the purge gas, a vacuum generator supply gas passes through valve 318 and valve 317 and through the venturi in vacuum generator 316. The vacuum generator supply gas flow through the venturi in vacuum generator 316 creates a vacuum that in turn speeds up the evacuation of gas supply system 303 during the purge operation.

In each of the above gas supply systems 103, 203 and 303, the process line gas flow is blocked during operations in which the gas supply system is purged of the hazardous gas. These gas supply systems do not provide an automated means for purging the hazardous gas in process line 304. However, governmental regulations typically require purging the hazardous gas in the process line during or following abnormal events such as power failures, earthquakes, tornadoes, fires, or other natural hazards.

In one system used to purge process line 104 (FIG. 1) of any hazardous material, a valve is supplied in point of use 105 vent line which automatically opens in an emergency. A purge gas is passed through process line 104 to point of use 105 and through the point of use vent. Purging through point of use 105 may introduce contaminants and other problems with the equipment which are undesirable.

Another alternative is to run a second line from point of use 105 back to the vent in gas supply system 103. A valve in process line 104 at point-of-use 105 diverts the flow from point-of-use 105 to the return line during abnormal circumstances. In this case, the purge gas flows through the process line and is diverted by the valve at the point of use to the return line. The purge gas forces the hazardous gas from the process line back through gas supply system 103 to the vent. Unfortunately, the dual piping and the specifications required for hazardous gas piping greatly increase the cost of the system. Accordingly, a low cost and reliable means for purging the process line of hazardous gas during abnormal situations is needed.

Summary of the Invention

According to the principles of this invention, a gas supply system at the gas supply point includes an automated means for evacuating gas in a process line fed by the gas supply system when an abnormal event occurs, i.e., the process line is automatically evacuated upon the occurrence of a predetermined event. The gas supply system of this invention eliminates the need for any special valves or piping at the point of use as well as the need for a return line from the point of use to the gas supply system to purge the process line. Accordingly, the limitations of prior art systems in purging the process line have been eliminated.

Typically, a process gas supply is contained in a cylinder under pressure. The process gas supply is coupled to a process line by a gas supply system of this invention. The gas supply system includes a gas flow controller and an automatic evacuation system.

During normal operation, the process gas flows from the process gas supply through the gas flow controller of the gas control system to the process line and in turn through the process line to a point of use, such as an epitaxial reactor used in semiconductor processing or some other apparatus that utilizes a process gas. Herein, "normal operation" or "normal operations" means that gas is being supplied through the process line to the point of use and the apparatus at the point of use is performing the desired operation or process.

Upon the occurrence of a predetermined event, such as an earthquake, a fire, a process gas leak, or the pushing of a panic switch, gas flow from the gas supply is blocked by the gas flow controller and the automatic evacuation system automatically evacuates the process gas not only from the gas flow controller, but also from the process line. Thus, the process line is evacuated without any modifications at the point of use and without running a return line from point of use to the gas supply system. Consequently, any danger from the process gas in the process line is eliminated without the costly and inefficient methods used in the prior art.

In one embodiment, the process gas from the cylinder flows through a shut-off valve in the gas flow controller to a two-stage pressure regulator. The shut-off valve is an air-operated valve that fails closed and so is referred to as a normally-closed valve. During normal operation, air pressure holds the shut-off valve open so that the process gas flow from the cylinder to the regulator is not inhibited. Thus, the shut-off valve has a first and a second position and is normally in the first position. However, in normal operations, a means, connected to the valve, holds the valve in the second position, but upon the occurrence of the predetermined event, the holding means releases the valve so that the valve returns to the first position thereby shutting-off the process gas flow from the process gas supply.

During normal operation, the process gas flows from the regulator to the process line and on to the point of use. The gas supply system of this invention also contains two other air-operated valves. A first air-operated normally-open valve connects the process line and the low pressure side of the regulator to the automatic evacuation system, while the second normally open air-operated valve connects the high pressure side of the regulator and the gas supply line to the regulator to the automatic evacuation system. These air-operated valves fail open and are referred to as normally-open valves. During normal operation, air pressure holds these valves closed so that the process gas flow is from the cylinder through the regulator to the process line.

Thus, the gas supply system of this invention also includes a valve, connected to the automatic evacuation means, having a first position and a second position where the valve is normally in the second position and a means, connected to the valve, holds the valve in the first position during normal operation of the gas flow controller, but upon the occurrence of the predetermined event, the holding means releases the valve so that the valve returns to the second position thereby connecting the gas flow controller to the automatic evacuation means.

Thus, in an abnormal event, the air is cut-off to the air-operated shut-off valve and to the first and second air operated valves. When the shut-off valve closes, and the other two valves open, all the gas lines on the regulator side of the shut-off valve are directly connected to the automatic evacuation system.

A purge gas is supplied to the automatic evacuation system. The purge gas flows through a check valve to a normally-open air-operated shut-off valve. During normal operation, air pressure holds the normally-open shut-off valve closed so that there is no purge gas flow through the automatic evacuation system.

In the abnormal event, air is cut-off and the normally-open shut-off valve opens so that the purge gas flows through a vacuum generator. For a purge gas flow with about a pressure of 80 psi at standard conditions, the vacuum generator creates a vacuum equivalent to thirty inches of mercury. This vacuum is drawn the first and second normally-open air-operated valves in the gas flow controller. .Consequently, the vacuum evacuates the process gas from the process line and from the piping in gas flow controller to the vacuum generator.

As the process gas is drawn into the vacuum generator, the process gas is diluted by the purge gas and flows to a vent line. Hence, the automated evacuation system evacuates the process gas from the process line upon occurrence of the abnormal event without manual intervention. Since the gas supply system of this invention with the automated evacuation system is very simple and utilizes readily available parts, the ease and efficiency of purging the process line is significantly enhanced over prior art systems and at the same time, the cost is significantly reduced.

DETAILED DESCRIPTION

According to the principles of this invention, a gas supply system at the gas supply point includes an automated means for evacuating gas in a process line fed by the gas supply system when an abnormal event occurs. The gas supply system of this invention eliminates the need for any special valves or piping at the point of use as well as the need for a return line from the point of use to the gas supply system to purge the process line. Accordingly, the limitations of prior art systems in purging the process line have been eliminated.

Figure 1:
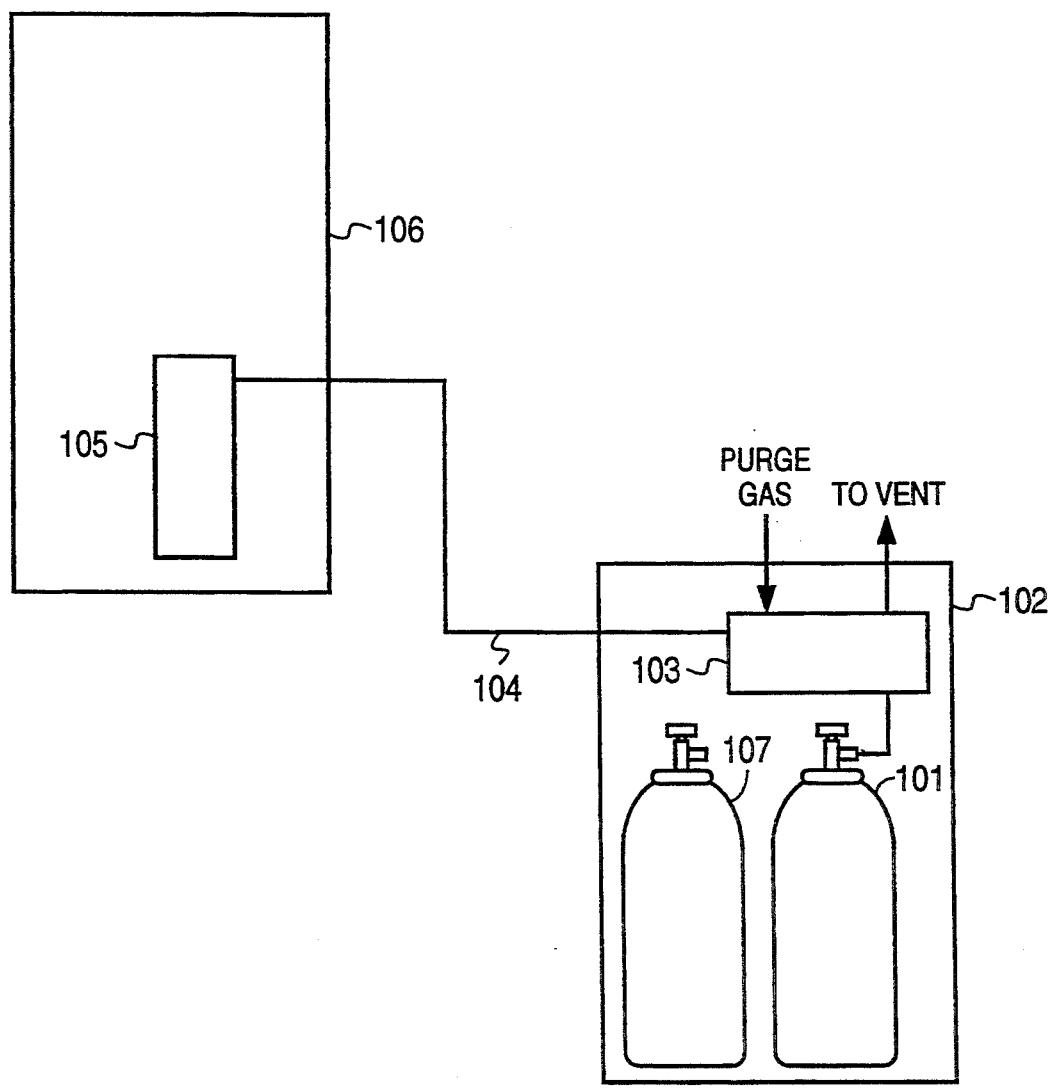
FIG. 1 is a block diagram of a prior art gas supply system.
Figure 2:
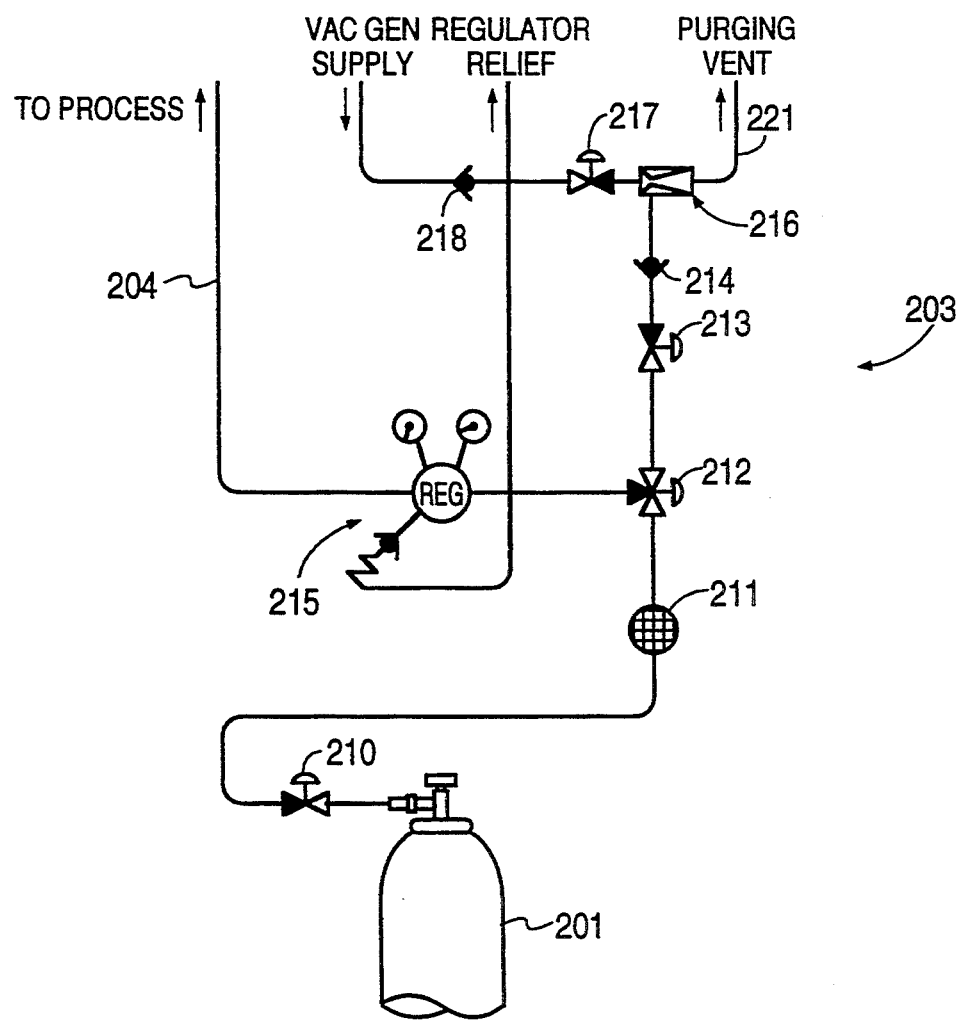
FIG. 2 is a more detailed diagram of one prior art gas supply system.
Figure 3:
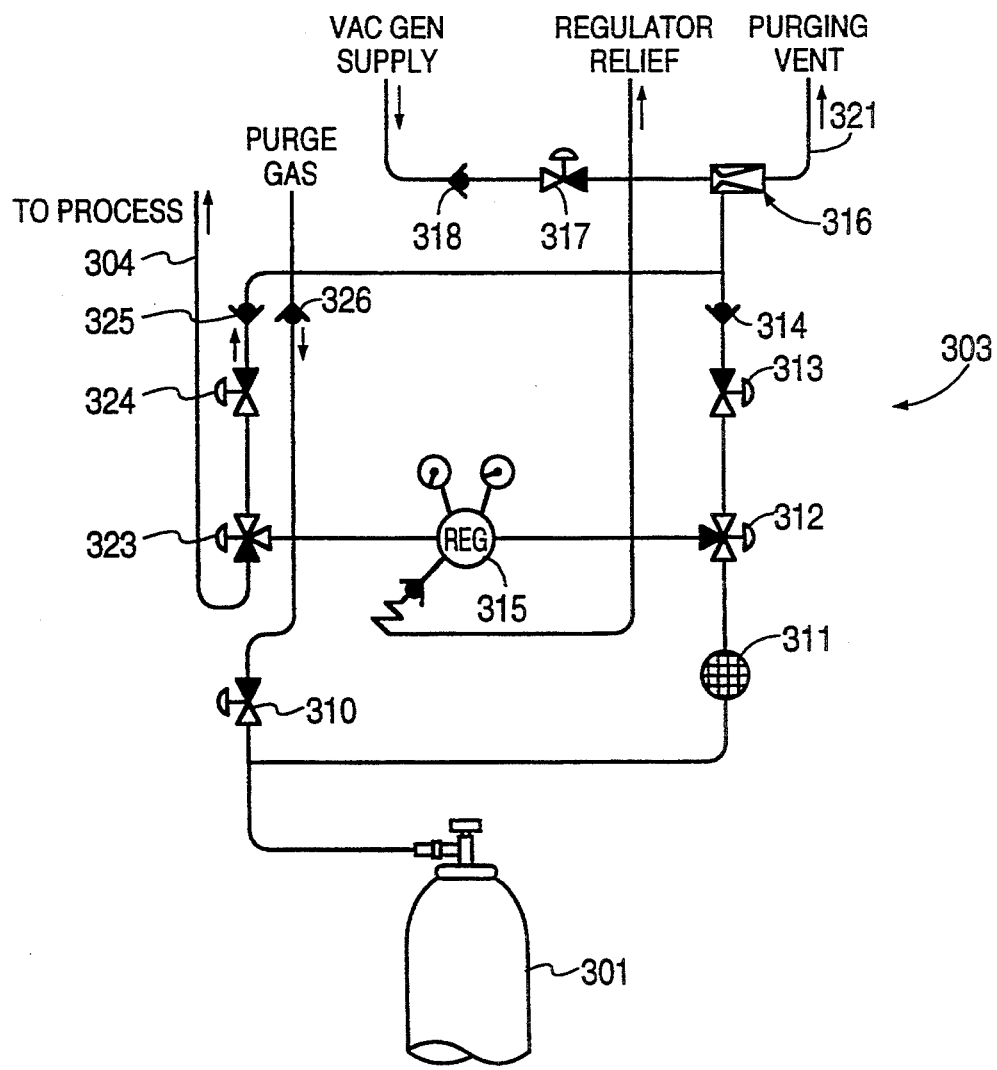
FIG. 3 is a more detailed diagram of another prior art gas supply system.
Figure 4:
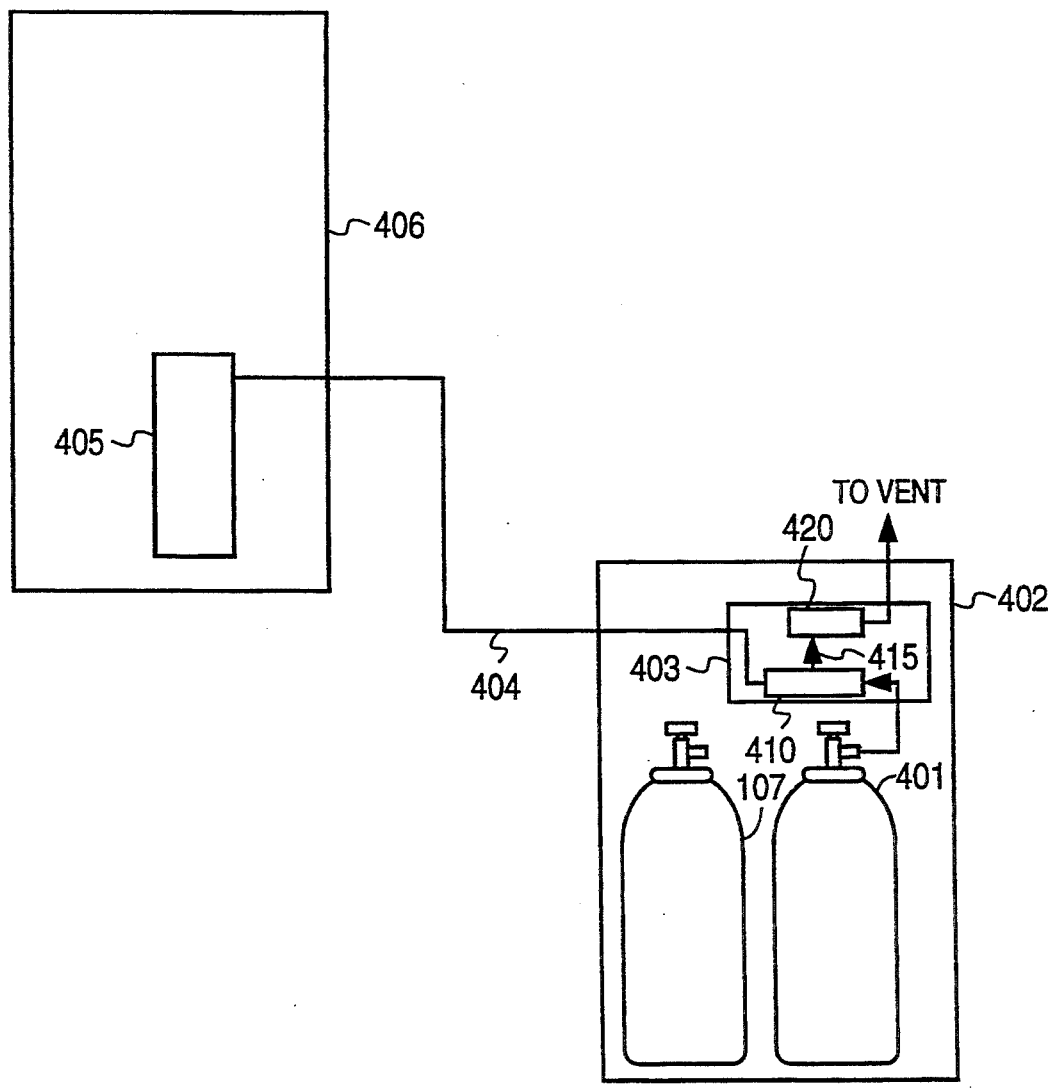
FIG. 4 is a block diagram of the gas supply system of this invention including means for automatically evacuating the process line.

One embodiment of the gas supply system of this invention is illustrated in FIG. 4. A hazardous gas is contained in a cylinder 401 under pressure. Preferably, cylinder 401 is contained in a gas cabinet 402. Cylinder 401 is coupled to a process line 404 by a gas supply system 403. According to the principles of this invention, gas supply system 403 includes a gas flow controller 410 and an automatic evacuation system 420. As described more completely below, gas flow controller 410 controls the supply of the process gas from cylinder 401 to process line 404. Gas flow controller 410 is separate and distinct from any process gas controller within the apparatus at point of use 405.

During normal operation, the hazardous gas flows from cylinder 401 through gas flow controller 410 of gas control system 403 to process line 404 and in turn through process line 404 to a point of use 405, such as an epitaxial reactor used in semiconductor processing or some other apparatus that utilizes a process gas. Herein, "normal operation" or "normal operations" means that gas is being supplied through process line 404 to point of use 405 and the apparatus at point of use 405 is performing the desired operation or process. Typically, point of use 405 is in a special room 406 or facility that is located some distance from gas cabinet 402.

As explained more completely below, in an abnormal event, gas flow from cylinder 401 is blocked by gas flow controller 410 and path 415 from gas flow controller 410 to automatic evacuation system 420 is opened. Automatic evacuation system 420 evacuates the hazardous gas not only from gas flow controller 410, but also from process line 404. Thus, process line 404 is evacuated without any modifications at point of use 405 and without running a return line from point of use 405 to gas supply system 403. Consequently, any danger from the hazardous gas in process line 404 is eliminated without the costly and inefficient methods used in the prior art.

Figure 5:
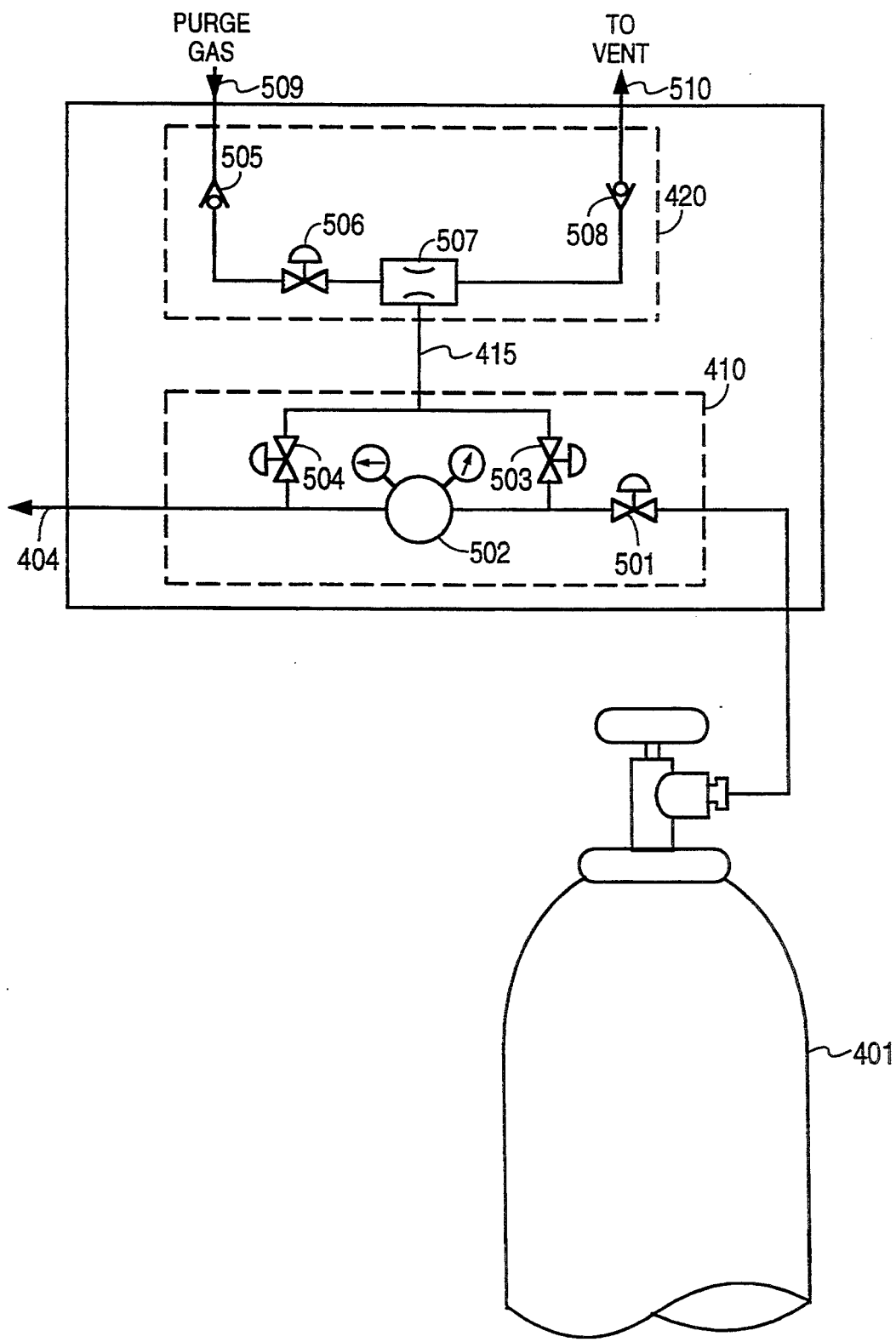
FIG. 5 is a more detailed diagram of the gas supply system of this invention including means for automatically evacuating the process line.

Gas supply system 403 is illustrated in more detail in FIG. 5. The hazardous gas from cylinder 401 flows through shut-off value 501 in gas flow controller 410 to a two-stage pressure regulator 502. Shut-off value 501 is an air-operated valve that fails closed and so is referred to as a normally-closed valve. During normal operation, air pressure holds shut-off valve 501 open so that gas flow from cylinder 401 to regulator 502 is not inhibited.

The gas flows from regulator 502 to process line 404 and on to point of use 405(FIG. 4). Gas supply system 403 also contains air-operated valves 503 and 504. Air-operated valve 504 connects process line 404 and the low pressure side of regulator 502 to automatic evacuation system 420, while air-operated valve 503 connects the high pressure gas supply line to regulator 502 to automatic evacuation system 420. Air-operated valves 503 and 504 fail open and are referred to as normally-open valves. During normal operation, air pressure holds valve 503 and 504 closed so that gas flow from cylinder 401 through regulator 502 to process line 404 is not diverted.

However, in an abnormal event, air is cut-off to valves 501, 503, and 504. When shut-off valve 501 closes, valves 503 and 504 open so that all gas lines on the regulator side of shut-off valve 501 are directly connected to automatic evacuation system 420. A purge gas is supplied to automatic evacuation system 420 by purge gas supply line 509. The purge gas flows through check valve 505 to air-operated valve 506. Air-operated valve 506 fails open and during normal operation, air pressure holds valve 506 closed so that there is no purge gas flow through automatic evacuation system 420.

In an abnormal event, air is cut-off and valve 506 opens so that the purge gas flows through vacuum generator 507. For a purge gas flow with about a pressure of 80 psi at standard conditions, vacuum generator 507 creates a vacuum equivalent to thirty inches of mercury. This vacuum is drawn on line 415 from valves 504 and 503 in gas flow controller 410 to vacuum generator 507. Consequently, the vacuum draws the hazardous gas from process line 404 and from the piping in gas flow controller 410 to vacuum generator 507.

As the hazardous gas is drawn into vacuum generator 507, the hazardous gas is diluted by the purge gas and flows through check valve 508 to vent line 510. Hence, automated evacuation system 420 evacuates the hazardous gas from process line 404 upon occurrence of the abnormal event, which opens valves 503, 504, and 506 and closes valve 501. Since gas supply system 403 with automated evacuation system 420 is very simple and utilizes readily available parts, the ease and efficiency of evacuating process line 404 is significantly enhanced over prior art systems and at the same time, the cost is significantly reduced.

Figure 6:
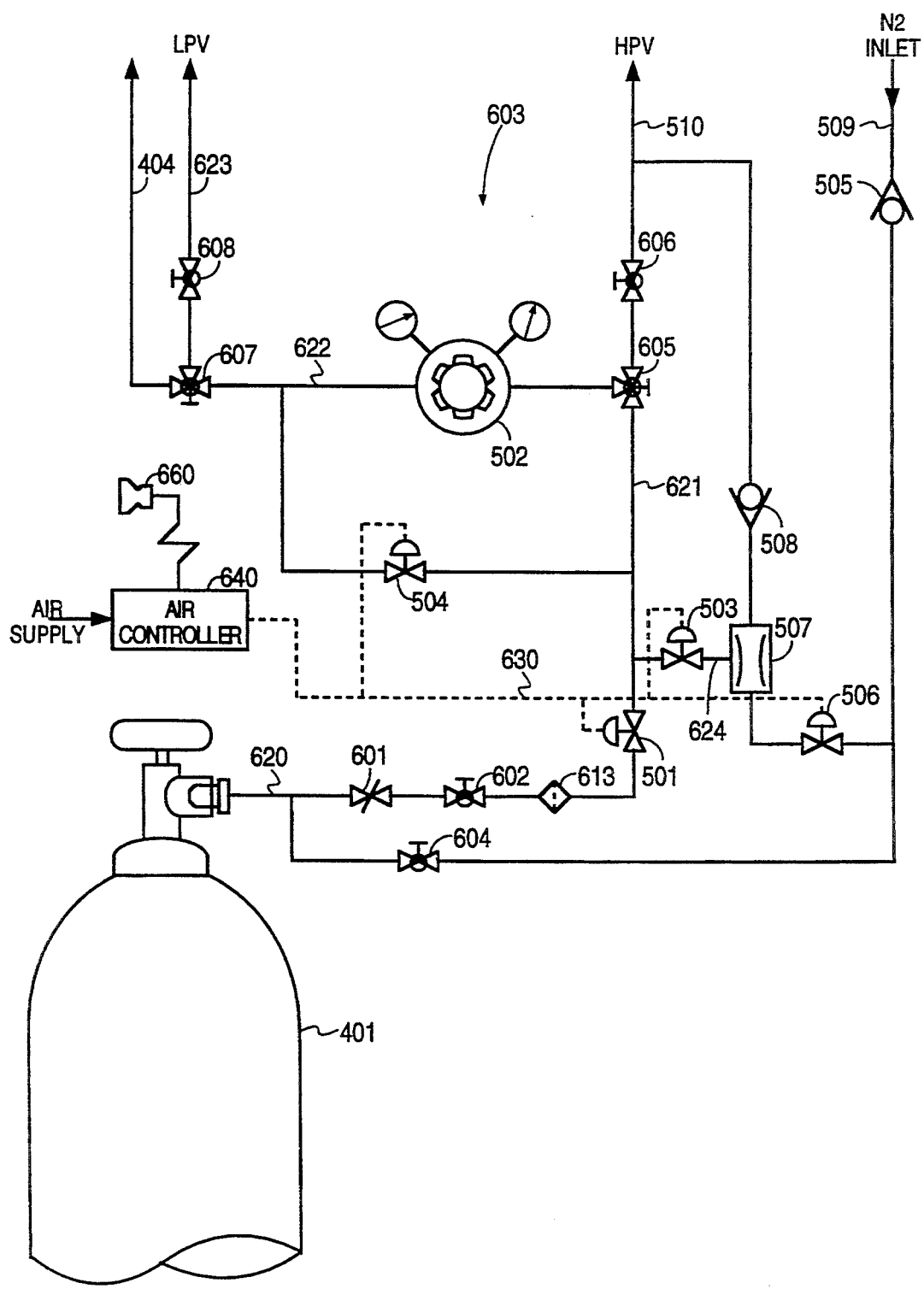
FIG. 6 is a detailed diagram of one embodiment of the dopant gas supply system of this invention including means for automatically evacuating the process line.

The preferred configuration of gas supply system 403 depends on the gas being utilized. However, gas supply system 403 preferably includes means for changing gas cylinder 401 as well as the components illustrated in FIG. 5 for automatically evacuating both gas supply system 403 and process line 404. For example, a gas supply system 603 for a dopant for an epitaxial radiant heated barrel reactor at the point of use is illustrated in FIG. 6.

Cylinder 401 (FIG. 6) contains one of the dopant gases commonly used for doping epitaxial layers. The dopant gas flows from cylinder 401 through flow control valve 601. In this embodiment, flow control valve 601 limits the dopant gas flow to about 50 standard liters per minute(slm). However, flow control valve 601 is selected based upon the gas used and the flow required for the process being performed at point of use 405 (FIG. 4).

In this embodiment, the dopant gas from flow control valve 601 (FIG. 6) flows through manually-operated isolation ball valve 602 to a filter 613. Filter 613 is optional and is not used in many applications. For epitaxial processes, filter 613 preferably removes particulates in the dopant gas with a size greater than about 0.5 microns.

After the dopant gas flows through filter 613, the dopant gas, in normal operations, flows through air-operated shut-off valve 501, which operates as described above. Dotted line 630 represents the air line to valve 501 from air supply controller 640. After the dopant gas leaves valve 501, the dopant gas flows through manually-operated three-way ball valve 605 to two-stage pressure regulator 502. Valve 605 is a high pressure vent control valve. Valve 605 directs the dopant gas flow to either regulator 502 or high pressure vent 510, but not to both simultaneously.

The dopant gas from two-stage regulator 502 flows through a second manually-operated three-way ball valve 607, i.e., the low pressure vent control valve, to process line 404. Valve 607 directs the dopant gas flow to either process line 404 or low pressure vent line 623, but not to both simultaneously. Hence, during normal operation valves 602 and 501 are open and valves 605 and 607 direct the dopant gas flow to regulator 502 and from regulator 502 to process line 404, respectively.

Manually-operated low pressure vent isolation ball valve 608, that connects low pressure vent line 623 to low pressure vent control valve 607, is closed during normal operation of gas supply system 603 of this invention. Similarly, manually-operated high pressure vent isolation ball valve 606, that connects high pressure vent line 510 to high pressure vent control valve 605, is closed during normal operation of gas supply system 603 of this invention.

Also, during normal operation, air-operated valve 504 that is contained in a line connecting regulator output line 622 to regulator input line 621, and air-operated valve 503, that is contained in a line connecting regulator input line 621 to vacuum generator 507, are both held closed by air from air supply controller 640. Notice that in this embodiment, valves 504 and 503 are effectively connected in series while in FIG. 5, valves 504 and 503 were connected in parallel. Both configurations of valves 504 and 503 are equivalent and the particular embodiment selected depends on the space available and the relative locations of the various lines to which the gas supply system of this invention must be connected. The important aspect is that both the high and low pressure lines to and from the pressure regulator and the process line have a fail-safe path to vacuum generator 507.

Nitrogen, i.e., the purge gas, flows through line 509 to check valve 505, which in this embodiment is a one pound per square inch(psi) check valve. The nitrogen from check valve 505 flows to air-controlled valve 506, which is held closed by air from air supply controller 640 in normal operations. The nitrogen from check valve 505 also flows to manually-operated ball valve 604, which is closed during normal operation. Valve 604 is connected to inlet line 620 that connects cylinder 401 to flow control valve 601. Air-controlled valve 506 is connected to vacuum generator 507, which in turn is connected to high pressure vent line 510 through check valve 508. Check valve 508 is a one psi check valve.

As is known to those skilled in the art, valves 605 to 608 are used if it is necessary to change pressure regulator 502. To change cylinder 401, valve 607 is configured to connect low pressure vent line 623 to regulator 502 and valve 608 is opened. Valve 604 is then opened and the dopant gas is purged from gas supply system 603 by the nitrogen gas that flows through the system. After the nitrogen gas purges the system, valves 602 and 604 are closed. Cylinder 401 is replaced and then valve 602 is reopened. After the dopant gas refills gas supply system 603, valve 608 is closed and valve 607 is repositioned for normal operations.

If an abnormal event occurs, i.e., an occurrence of a predetermined event, transducer 660 generates a signal that causes air supply controller 640 to terminate the air supply to valves 501, 503, 504 and 506. Transducers typically used include an earthquake sensor, leak detectors in the gas cabinet, at the point of use, and in rooms along the path of the of the process line, and manually-operated panic switches that are located at various points throughout the facility. The use and operation of such transducers are well known to those skilled in the art. Thus, "predetermined event," as used herein, means a specified type of event, which is considered an abnormal event. Abnormal events include by way of example earthquakes, fires, other natural disasters, and leaks, as well as manual activation of a panic switch.

Upon the occurrence of the predetermined event and the shut-off of the air supply, valves 604, 606, and 608 are closed and valves 605 and 607 are positioned to direct flow through regulator 502 to process line 404. When the air supply is terminated valve 501 closes and valves 503, 504, and 506 open. The resulting nitrogen flow through vacuum generator 507, which preferably has a pressure of about 80 psi, creates a vacuum of 30 inches of mercury on line 624 from valve 503 to vacuum generator 507. As explained above, this vacuum draws the dopant gas from process line 404 and the lines in gas supply system 603 into vacuum generator 507 where it is diluted with the nitrogen gas and exhausted through the high pressure vent.

The actual valves and piping sizes used in gas supply system 603 depend upon the dopant gas used. Preferably, all of the gas lines are constructed using stainless steel 316 or hastaloy. The diameter of the gas lines depends on the flow rates required. Typically, the outside diameter of the gas lines used in the gas supply system of this invention is in the range of about one-quarter of an inch to about one-half of an inch for flow rates ranging from about 50 slm to about 2,000 slm.

In the above embodiment, the manually-operated valves were ball valves. However, ball valves are somewhat leakier than diaphragm valves. Consequently, in another embodiment, the manually-operated ball valves including the three-way valves are replaced with diaphragm valves.

The selection of a particular valve size depends on the space available for the gas supply system of this invention and the gas flow rate as well as the gas line diameters. The valve must not be corroded by the gas and preferably, all materials in the valve are inert with respect to the gas being used. Valves used in gas systems for semiconductor processing must not introduce particulates. Thus, the valve seats of the air-operated valves are preferably made of teflon or a teflon-like material, such as the material sold by 3-M under the trademark "KEL-F".

Each valve preferably has a longevity, i.e., may be operated a certain number of times, such that operation of the valve does not control the lifetime of the gas supply system. Typically, the air-operated valves have a longevity of about 15,000 cycles and if expense and testing of the longevity is not a factor, a longevity of 30,000 cycles or more. In one embodiment, the air-operated valves are sold by NuPro of Cleveland, Ohio under Model No. SSHB54.

Preferably, the gas lines in the gas supply systems do not have any bends. In one embodiment, all connections, including connections to all elbows and tees used, are orbitally welded. Orbital welding is well-known to those skilled in the art and provides a strong leak-free connection. Table 1 is a parts list for one embodiment of the gas supply system 603.

TABLE 1

Parts List For One Embodiment of
The Gas Supply System of This Invention

| Component No. | Supplier | Location | Model No. |
| --- | --- | --- | --- |
| Valve 601 | VeriFlo | Richmond, CA | FLV110AST5044349 |
| Valve 602 | Whitey | Cleveland, OH | SS-43S4 |
| Valve 506 | NuPro | Cleveland, OH | SS4BKT |
| Valve 501 | NuPro | Cleveland, OH | SSHBS4 |
| Valve 503 | NuPro | Cleveland, OH | SSHBS4-0 |
| Valve 504 | NuPro | Cleveland, OH | SSHBS4-0 |
| Valve 505 | NuPro | Cleveland, OH | SS-4VCR |
| Valve 508 | NuPro | Cleveland, OH | SS-4VCR |
| Valve 604 | Whitey | Cleveland, OH | SS43S4 |
| Valve 605 | Whitey | Cleveland, OH | SS43XS4 |
| Valve 606 | Whitey | Cleveland, OH | SS43S4 |
| Valve 607 | Whitey | Cleveland, OH | SS43XS4 |
| Valve 608 | Whitey | Cleveland, OH | SS43S4 |
| Regulator 502 (Dopant) | VeriFlo | Richmond, CA | IRA0186P0140-4 |
| Vacuum Generator 507 | Air-Vac Eng. | Milford, CT | AVRO93H |

For gas control system 603, the gas lines are one-quarter inch outside diameter stainless steel with the inner diameter electro-polished so as to minimize particulates. The parts given in Table 1 are only illustrative of the principles of this invention and are not intended to limit the invention to the particular embodiment given.

Figure 7:
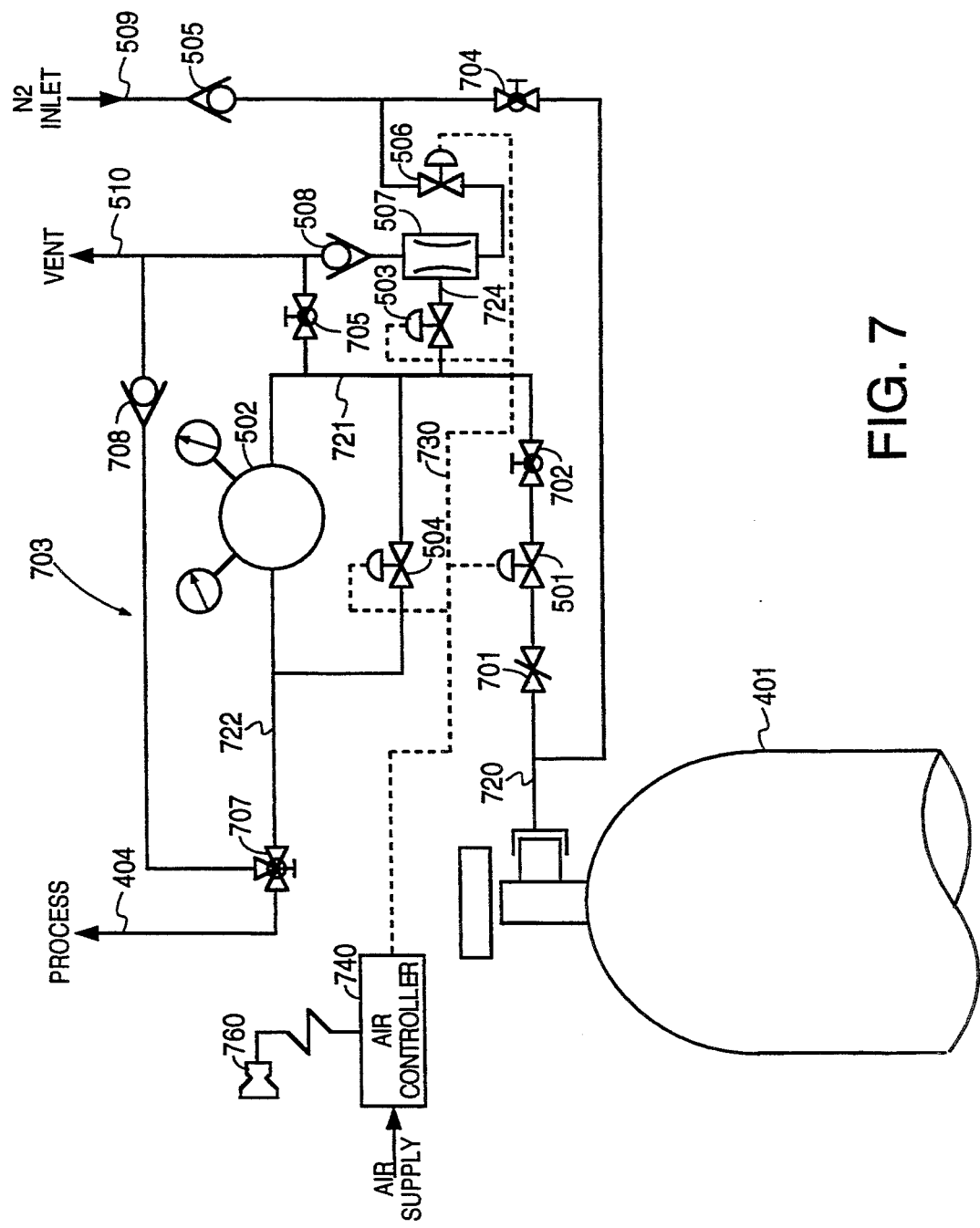
FIG. 7 is a detailed diagram of one embodiment of the etchant gas supply system of this invention including means for automatically evacuating the process line.

Another embodiment of a gas supply system 703 (FIG. 7), according to the principles of this invention, is for an etchant, such as hydrochloric acid, used in processing semiconductors. Cylinder 401 now contains a highly corrosive gas. The etchant gas flows from cylinder 401 through flow control valve 701. In this embodiment, flow control valve 701 limits the etchant gas flow to 50 standard liters per minute(slm).

In this embodiment, the etchant gas from flow control valve 701 flows, in normal operations, through air-operated shut-off valve 501, which operates as described above. Dotted line 730 represents the air line to valve 501 from air supply controller 740.

The etchant gas from air-operated shut-off valve 501 flows through manually-operated isolation ball valve 702 to two stage regulator 502. Notice that a filter is not used in this application. Manually-operated vent isolation ball valve 705, which is closed during normal operation, connects line 721 from valve 702 to regulator 502 to vent line 510.

The etchant gas from two-stage regulator 502 flows through a manually-operated three-way ball valve 707 to process line 404. Three-way ball valve 707 connects regulator output line 722 either to process line 404 or to vent line 510, but not to both simultaneously.

During normal operation, valves 702 and 501 are open and valves 705 and 707 direct the etchant gas flow to regulator 502 and from regulator 502 to process line 404 respectively. Also, during normal operation, air-operated valve 504, that is contained in a line connecting regulator output line 722 to regulator input line 721, and air-operated valve 503, that is contained in a line connecting regulator input line 721 to vacuum generator 507, are both held closed by air from air supply controller 740. Notice that in this embodiment, valves 504 and 503 are again effectively connected in series while in FIG. 5, valves 504 and 503 were connected in parallel.

Nitrogen flows through line 509 to check valve 505, which in this embodiment is a one pound per square inch(psi) check valve. The nitrogen from check valve 505 flows to air-controlled valve 506, which is held closed by air from air supply controller 740 in normal operations. The nitrogen from check valve 505 also flows to manually-operated ball valve 704, which is closed during normal operation. Valve 704 is connected to inlet line 720 that connects cylinder 401 to flow control valve 701. Air-controlled valve 506 is connected to vacuum generator 507, which in turn is connected to high pressure vent line 510 through check valve 508, which is a one psi check valve.

As is known to those skilled in the art, valves 705 and 707 are used if it is necessary to change pressure regulator 502. To change cylinder 401, valve 707 is configured to connect vent line 510 to regulator 502. Valve 704 is then opened and the etchant gas is purged from gas supply system 703 by the nitrogen gas that flows through system 703. After the nitrogen gas purges system 703, valves 702 and 704 are closed. Cylinder 401 is replaced and then valve 702 is reopened. After the etchant gas refills gas supply system 703, valve 707 is repositioned for normal operations.

If an abnormal event occurs during normal operations, transducer 760 generates a signal that causes air system controller 740 to terminate the air supply to valves 501, 503, 504 and 506. Consequently, valve 501 closes and valves 503, 504, and 506 open. The resulting nitrogen flow through vacuum generator 507, which preferably has a pressure of about 80 psi, creates a vacuum of 30 inches of mercury on line 724 from valve 503. As explained above, this vacuum draws the etchant gas from process line 404 and the lines in gas supply system 703 into vacuum generator 507 where it is diluted with the nitrogen gas and exhausted through the vent.

In the above embodiment, the manually-operated valves were ball valves. However, ball valves are somewhat leakier than diaphragm valves. Consequently, in another embodiment, the manually-operated ball valves including the three-way valve are replaced with diaphragm valves.

Table 2 is a parts list for one embodiment of the gas supply system 703. Again, the gas lines are one-quarter inch outside diameter stainless steel with the inner diameter electro-polished.

TABLE 2

Parts List For Another Embodiment of
The Gas Supply System of This Invention

| Component No. | Supplier | Location | Model No. |
| --- | --- | --- | --- |
| Valve 701 | VeriFlo | Richmond, CA | FLV110AST5044 |
| Valve 702 | Whitey | Cleveland, OH | SS-43S4 |
| Valve 506 | NuPro | Cleveland, OH | SS4BKT |
| Valve 501 | NuPro | Cleveland, OH | SSHBS4 |
| Valve 503 | NuPro | Cleveland, OH | SSHBS4-0 |
| Valve 504 | NuPro | Cleveland, OH | SSHBS4-0 |
| Valve 505 | NuPro | Cleveland, OH | SS-4VCR |
| Valve 508 | NuPro | Cleveland, OH | SS-4VCR |

TABLE 2-continued

Parts List For Another Embodiment of
The Gas Supply System of This Invention

| Component No. | Supplier | Location | Model No. |
|---|---|---|---|
| Valve 704 | Whitey | Cleveland, OH | SS-43S4 |
| Valve 705 | Whitey | Cleveland, OH | SS-43S4 |
| Valve 707 | Whitey | Cleveland, OH | SS43XS4 |
| Regulator 502 (HCL) | Matheson | Montgomery, PA | B15A330 |
| Vacuum Generator 507 | Air-Vac Eng. | Milford, CT | AVRO93H |

Figure 8:
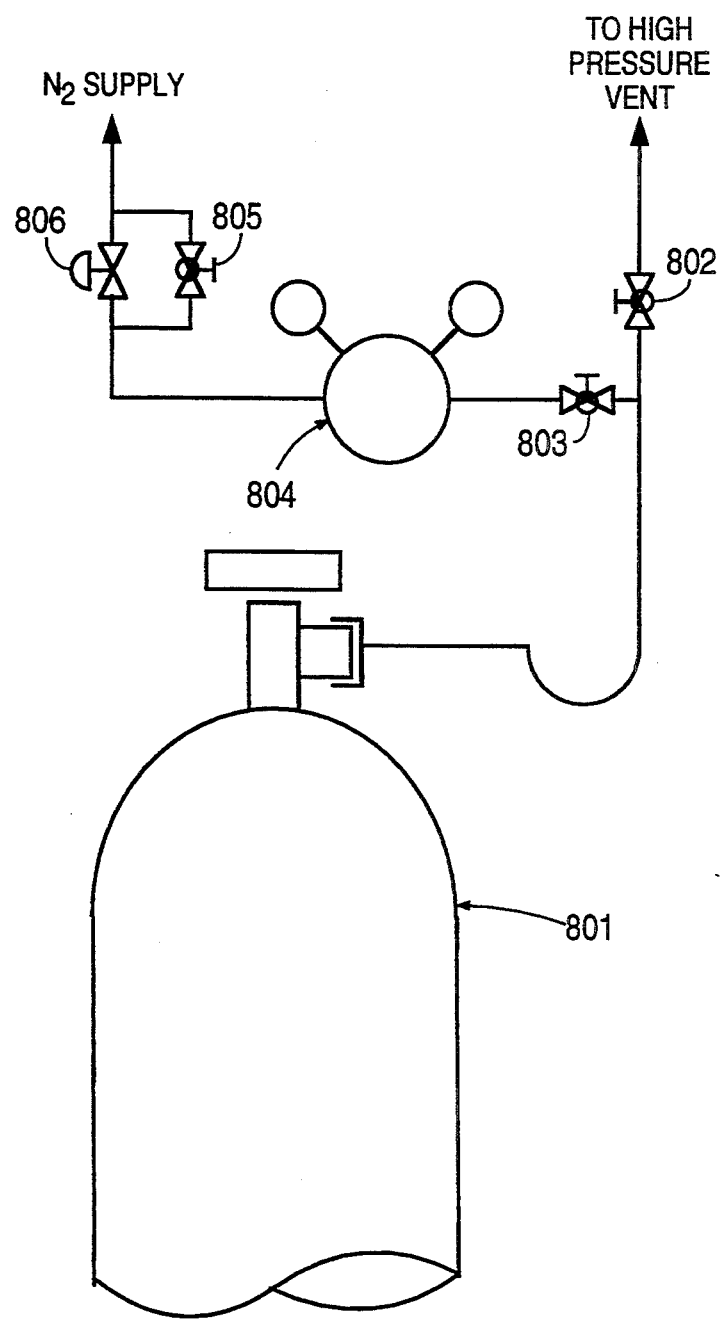
FIG. 8 is a detailed diagram of a purge gas supply system suitable for use with the gas supply system of this invention.

Each of the previous embodiments of this invention include a nitrogen supply that is used to automatically drive a vacuum generator which in turn evacuates the gas supply system of this invention and the process line. As explained above, the nitrogen gas is passed through a vacuum generator to draw a vacuum on the gas supply system and the process line. One nitrogen supply suitable for use with this invention is illustrated in FIG. 8.

The nitrogen gas from cylinder 801 flows through manually-operated isolation ball valve 803 to two-stage regulator 804. High pressure vent ball valve 802 is normally-closed. After the nitrogen gas leaves regulator 804, the gas flows through the parallel combination of manually-operated ball valve 805, which is normally-open, and air-operated valve 806, which is also normally-open. However, during normal operation, an air supply holds valve 806 closed so that the nitrogen gas passes only through manually-operated valve 805.

When an abnormal event occurs, the air supply is terminated, as explained above, and so valve 806 opens. Thus, even if manually-operated valve 805 is inadvertently left closed, a nitrogen source is available when an abnormal event occurs. Again, if leakage from the ball valves is of concern, the valves are replaced with diaphragm valves.

In one embodiment, a manual switch is provided for the air controller. When the manual switch is operated, the air controller cuts off the air supply to the air-operated valves in the process gas supply system of this invention, and consequently, the process line is evacuated as described above. The manual switch is used when apparatus at the point of use will not be used for an extended period, such as over a weekend. After the process line is evacuated, the manually-operated valves in the process gas supply system are positioned to isolate the flow of the process gas from the process gas supply.

In view of this disclosure, those skilled in the art will be able to use the principles of this invention in a wide-variety of applications. The automatic evacuation of both the gas supply system and the process line through the addition of selected valves and an evacuation means to the gas supply system provide a low cost efficient system for complying with governmental regulations upon occurrence of a predetermined event and therefore has widespread applicability. Thus, the above embodiments are only illustrative of principles of this invention and are not intended to limit the invention to the particular embodiments described.

We claim:

1. A method for operating a gas supply system that includes a valve connected to a gas supply, said valve having a first position and a second position, wherein said valve is normally in said first position, said method comprising the steps of:

establishing a flow of a process gas to a process line through said gas supply system during normal operating conditions by holding said valve in said second position during normal operation of said gas supply system; and thereafter.

stopping the flow of said process gas through said gas supply system to said process line by isolating gas flow from said gas supply to said gas supply system upon the occurrence of a predetermined event; and evacuating said process gas from said process line through said gas supply system upon the occurrence of said predetermined event by releasing said valve so that said valve returns to said first position, thereby isolating said gas flow from said gas supply.

2. The method of claim 1, wherein said valve is closed in said first position and said valve is open in said second position.

3. A method for operating a gas supply system having a valve with a first position and a second position, wherein said valve is normally in said second position, said method comprising the steps of:

holding said valve in said first position to establish a flow of a process gas to a process line through said gas supply system during normal operating conditions; and thereafter stopping the flow of said process gas through said gas supply system to said process line upon the occurrence of a predetermined event; and releasing said valve upon the occurrence of said predetermined event so that said valve returns to said second position, thereby evacuating said process gas from said process line through another valve in said gas supply system.

4. The method of claim 3, wherein said valve is closed in said first position and said valve is open in said second position.

5. A method for operating a gas supply system comprising the steps of:

establishing a flow of a process gas to a process line through said gas supply system during normal operating conditions; and thereafter, stopping the flow of said process gas through said gas supply system to said process line upon the occurrence of a predetermined event; and drawing a vacuum on said process line by connecting a vacuum generator to a second gas supply, and to said process line upon the occurrence of said predetermined event, wherein gas flow from said second gas supply through said vacuum generator causes said vacuum generator to draw said vacuum on said process line, thereby evacuating said process gas from said process line through said gas supply system and further wherein said second gas supply is different from said first-mentioned gas supply.

6. The method of claim 5, wherein said step of drawing a vacuum further comprises the steps of:

holding a valve positioned between said second gas supply and said vacuum generator, in a first position during normal operation of said gas supply system; and releasing said valve upon the occurrence of said predetermined event so that said valve goes to a second position so as to permit gas flow from said second gas supply through said vacuum generator.

7. The method of claim 6, wherein said valve is closed in said second position and said valve is open in said first position.

* * * * *